United States Patent [19]

Nebu et al.

[11] Patent Number: 4,830,423
[45] Date of Patent: May 16, 1989

[54] ADJUSTABLE WINDSHIELD FOR VEHICLE

[75] Inventors: Hideaki Nebu; Takahisa Suzuki, both of Saitama; Yoshiaki Swano, Tokyo, all of Japan

[73] Assignee: Honda Giken Kogyo Kabushiki Kaisha, Tokyo, Japan

[21] Appl. No.: 113,163

[22] Filed: Oct. 27, 1987

[30] Foreign Application Priority Data

Oct. 27, 1986 [JP] Japan .................. 61-164402[U]

[51] Int. Cl.⁴ .................................... B62J 17/02
[52] U.S. Cl. ......................... 296/78.1; 296/84.1
[58] Field of Search ............ 296/78.1, 78 R, 84 R, 296/84 A, 84 G; 280/289 S; 2/424

[56] References Cited

U.S. PATENT DOCUMENTS

| 4,269,445 | 5/1981 | Gager | 296/78.1 |
| 4,355,838 | 10/1982 | Hickman | 296/78.1 |
| 4,465,315 | 8/1984 | Barstow | 296/78.1 |
| 4,514,006 | 4/1985 | Maruoka | |

FOREIGN PATENT DOCUMENTS 58-37742 8/1983 Japan .

Primary Examiner—Robert B. Reeves
Assistant Examiner—Brian Sells
Attorney, Agent, or Firm—Lyon & Lyon

[57] ABSTRACT

An adjustable windshield for mounting on the front of a motorcycle, or the like, has a clamp late for locking the windshield in its adjusted position with respect to the motorcycle body. A releasable latching mechanism for operating the clamp plate is so disposed on the motorcycle body that it is accessible to the rider while seated astride the vehicle. Consequently, the windshield can be adjusted and locked in its adjusted position by the rider while astride the vehicle.

5 Claims, 5 Drawing Sheets

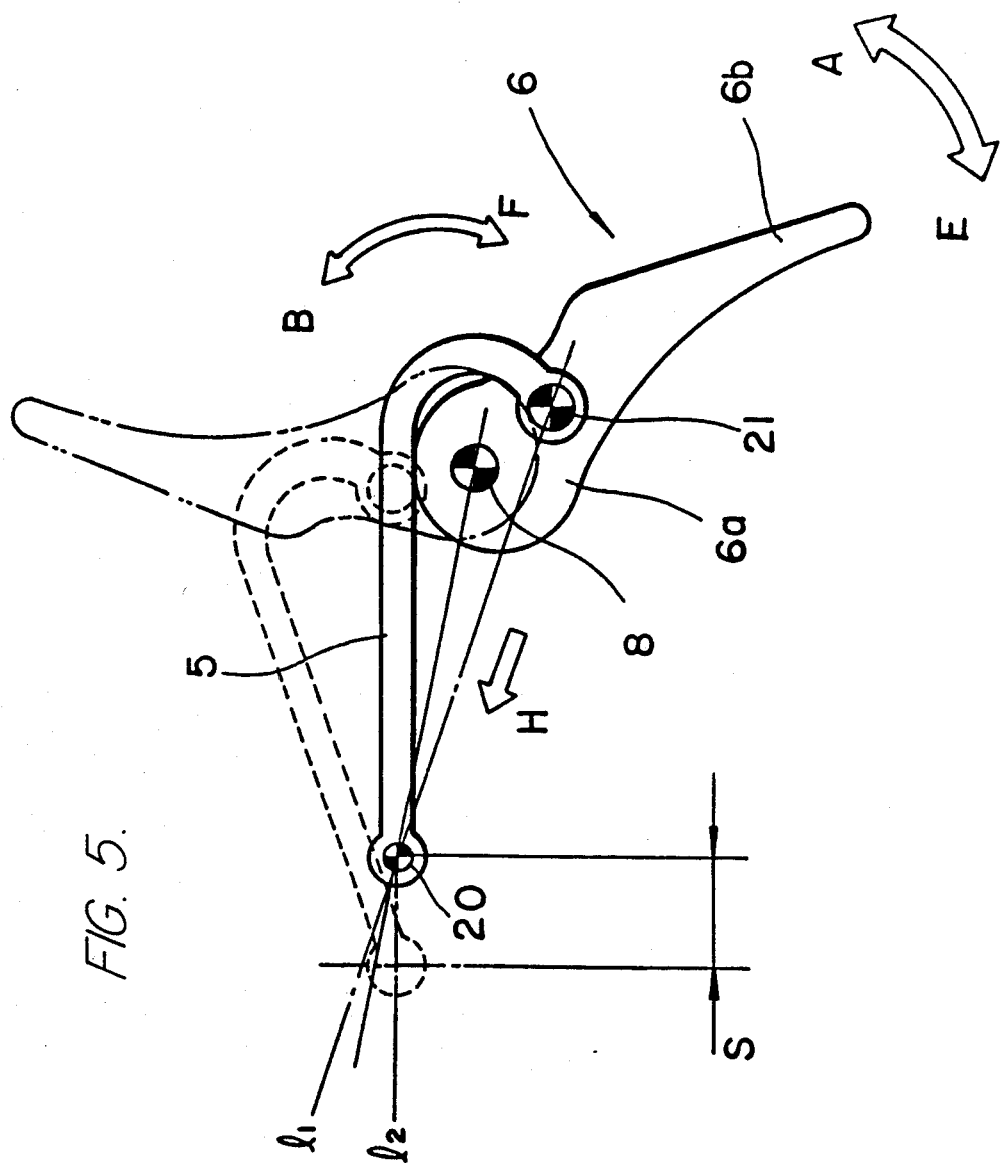

ADJUSTABLE WINDSHIELD FOR VEHICLE

BACKGROUND OF THE INVENTION

The present invention relates to an adjustable windshield for a vehicle and, more particularly, to a vertically adjustable windshield especially suited for a two-wheeled motorcycle.

Some vehicles, such as two-wheeled motorcycles, have windshields mounted in front of the driver. Some of these windshields are vertically adjustable to accommodate the riding posture and the physical constitution of the driver, and have a lock member for locking the windshield in its adjusted position. One example of a lock member of a vertically adjustable windshield of a vehicle is disclosed in Japanese Utility Model Publication No. 37,742/1983, where screw members are mounted in the central lower portion of the front surface of the windshield. When the screw members are loosened, the windshield is made vertically adjustable. By tightening the screw members the windshield can be locked in its adjustment position.

Whenever the driver operates the lock member constructed as described above, he must dismount the vehicle. On the other hand, the driver must be in a riding position on the vehicle in order to determine whether the windshield is in the best adjustment position, because the position of the windshield must be suited for the physical constitution and the riding posture of the driver. Consequently, the driver must repeatedly mount and dismount the vehicle until the best adjustment position for the windshield is attained.

It is, therefore, an object of the present invention to provide a windshield which can be adjusted while the driver is seated in a riding position of the vehicle.

SUMMARY OF THE INVENTION

According to the present invention a vertically adjustable windshield for a vehicle is mounted on the front portion of the vehicle so as to be vertically movable. The windshield is locked in its adjustment position by a lock member mounted on the front portion of the vehicle body. The lock member is so disposed that it can be operated by the driver while seated on the vehicle.

Therefore, the driver is able to operate the lock member to unlock the windshield while sitting on the vehicle. Thereafter, the windshield can be vertically moved into the position which is optimum for the sitting driver, following which the lock member is again operated to lock the windshield in its adjusted position.

BRIEF DESCRIPTION OF THE DRAWINGS

FIG. 5 is a plan view of the locking member of the present invention illustrating its mode of operation.

DESCRIPTION OF A PREFERRED EMBODIMENT OF THE INVENTION

Figure 1:
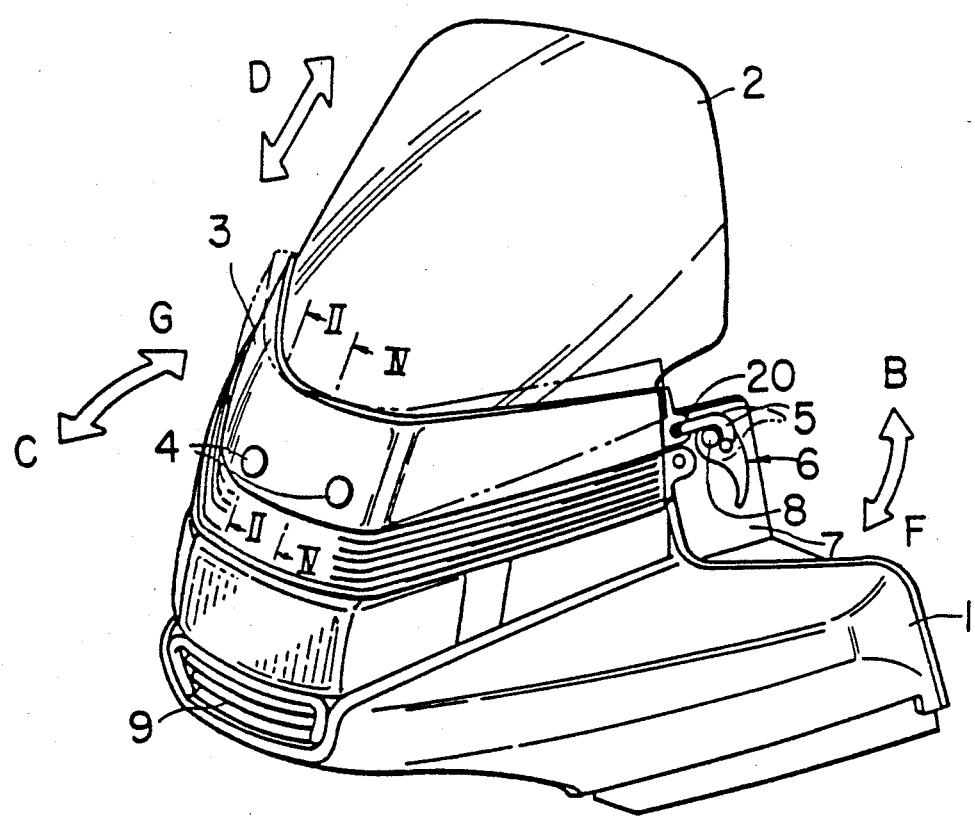
FIG. 1 is a perspective view of a windshield for a vehicle according to the present invention.

FIG. 1 illustrates a fairing 1 that covers the front portion of the body of a two-wheeled motorcycle, as well as a windshield 2 mounted on the fairing. The windshield 2 is made of a transparent material, such as a plastic, and is mounted so as to be vertically movable relative to the fairing 1. A clamp plate 3 is disposed to cover the junction between the fairing 1 and the windshield 2, and operates to limit the vertical movement of the windshield on the fairing. The lower end of the clamp plate 3 is attached to the fairing 1 by shoulder bolts 4 and can undergo a limited degree of pivotal movement about the bolts 4 as shown in phantom in FIG. 2.

One end of a link rod 5 is mounted to one side of the clamp plate 3, while its other end is attached to handle 6. As shown in FIG. 5, the handle 6 has an enlarged base portion 6a at its one end. An operating arm 6b extends radially from this enlarged base portion 6a.

The fairing 1 is provided with a step portion 7 formed at one side thereof. The enlarged base portion 6a of the handle 6 is pivotally mounted on the step portion 7 by means of a pivot shaft 8. In the described arrangement the clamp plate 3, the link rod 5, and the handle 6 constitute a lock member. Consequently, when the handle 6 is rotated, the windshield 2 is locked or unlocked to permit it to be vertically moved. More specifically, when the handle is rotated in the direction indicated by the arrow B in FIG. 5, the windshield 2 is in its unlocked position. Thus, with the lock member in this condition the windshield 2 is allowed to be vertically moved. When the handle 6 is rotated in the direction indicated by the arrow F, the windshield 2 is caused to be locked in its adjustment position.

Indicated by numeral 9 is an opening in the fairing 1 to accommodate a light.

Figure 2:
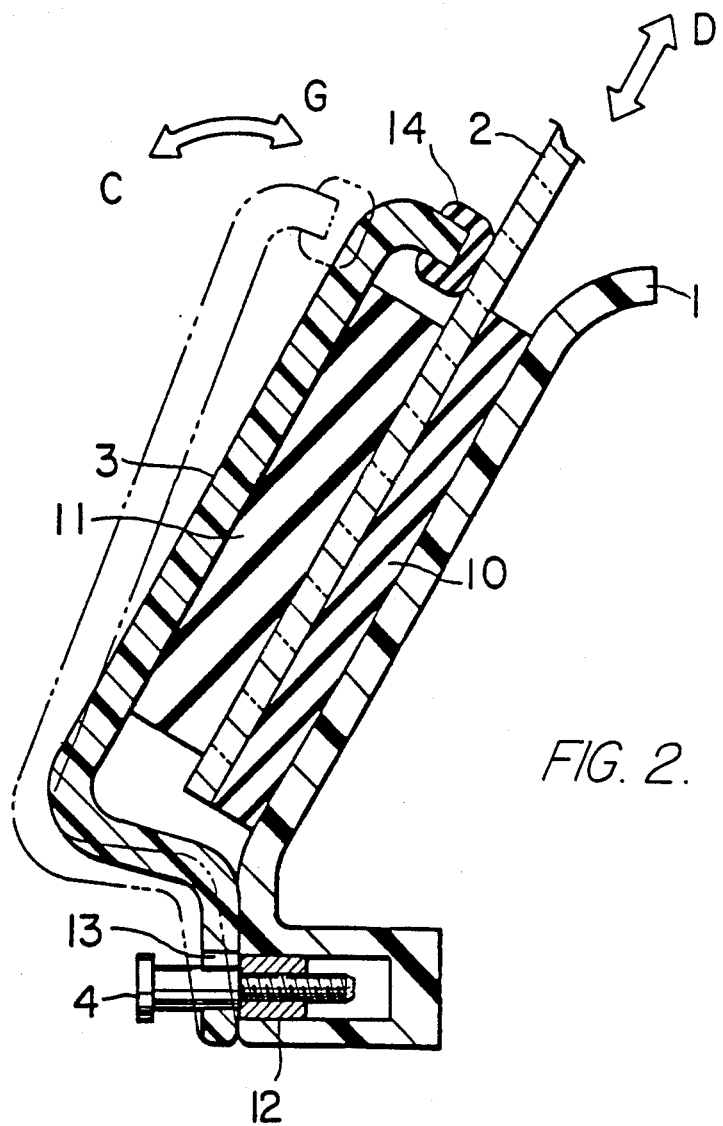
FIG. 2 is a sectional view taken on line II—II of FIG. 1.

As shown in FIG. 2, the windshield 2 can be pressed between the fairing 1 and the clamp plate 3 by means of frictional plates 10 and 11. In particular, the frictional plate 10 is bonded, or otherwise fastened, to the backside of the windshield 2 in front of the fairing 1. The frictional plate 11 is bonded or otherwise fastened to the backside of the clamp plate 3. The frictional plates 10 and 11 are made of a synthetic rubber, or other appropriate material. Alternatively, it is also possible to fix the frictional plates 10 and 11 to opposite sides of the windshield 2.

A nut 12 is inset in the lower portion of the fairing 1. A clearance 13 is formed at the lower end of the clamp plate 3. The shoulder bolt 4 passes through the clearance 13, and is tightened against the nut 12. The clearance 13 is slightly larger in diameter than the bolt 4 so that the clamp plate 3 can swing as indicated by the phantom lines in FIG. 2. A protective grooved member 14 made of rubber, or other material, is fitted over the downturned end edge of the plate 3 to protect the windshield against damage caused by its engagement with the edge of the clamp plate.

Figure 3:
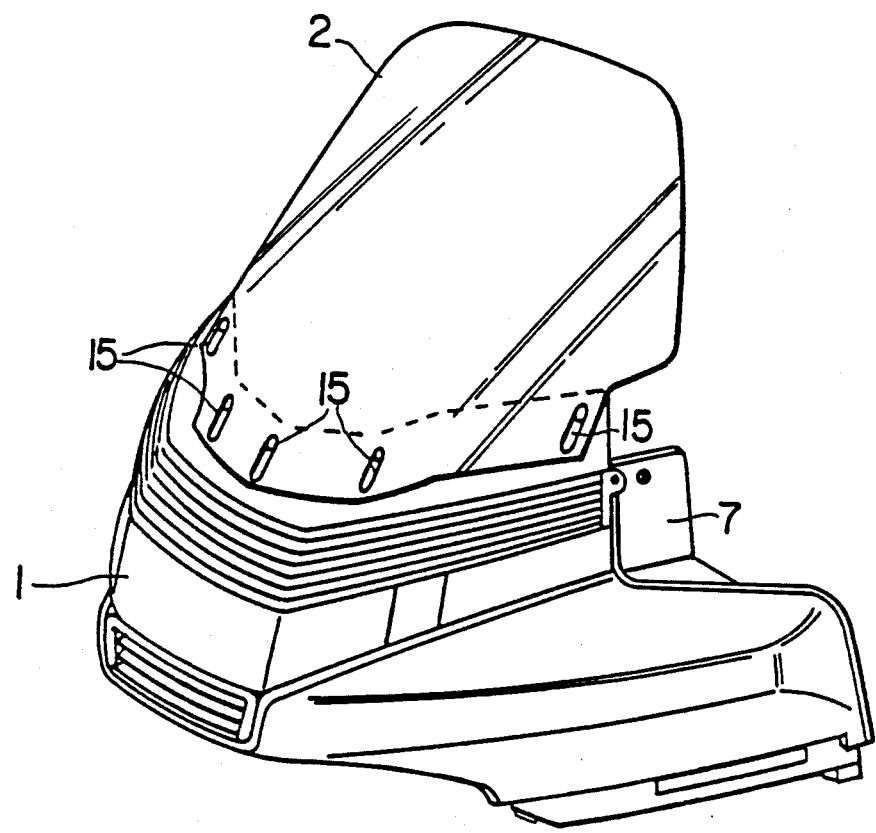
FIG. 3 is a perspective view of the principal parts of the windshield arrangement of FIG. 1.
Figure 4:
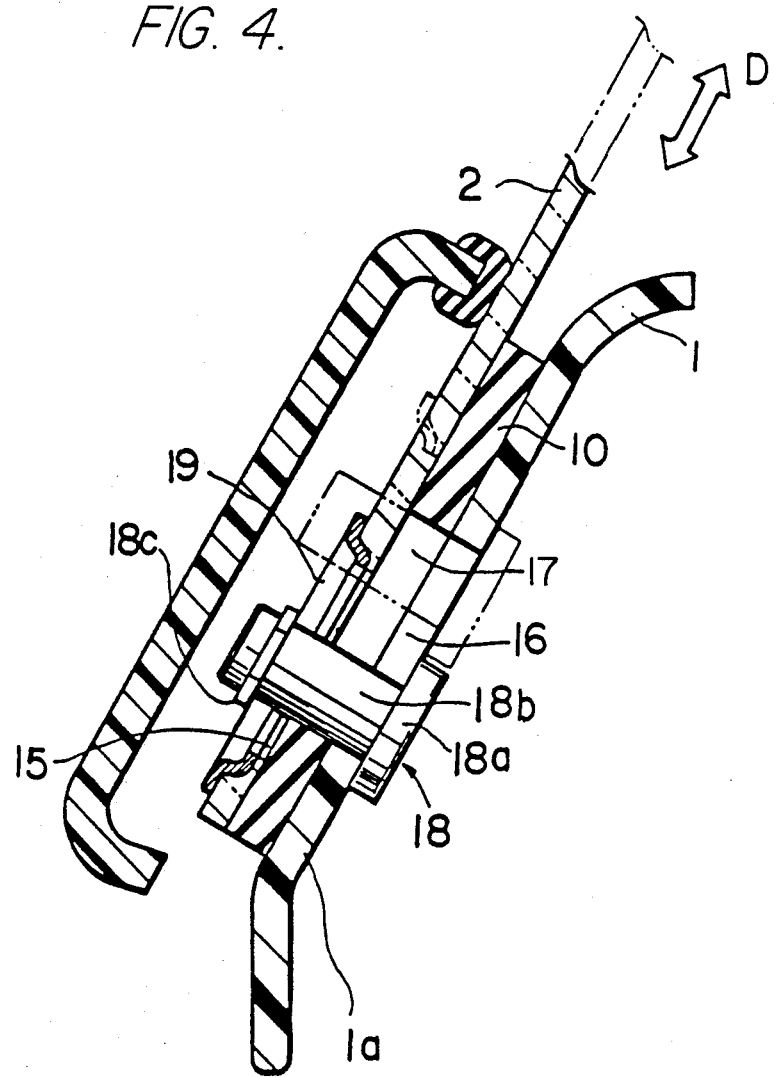
FIG. 4 is a sectional view taken on line IV—IV of FIG. 1.

FIGS. 3 and 4 illustrate the manner in which the windshield 2 is mounted to the fairing 1. As shown, vertically extending slots 15 are formed in the lower portion of the windshield 2. Slots 16 corresponding to the slots 15 are formed in the upper portion of the fairing 1. Similarly, the frictional plate 10 interposed between the fairing 1 and the windshield 2 is provided with slots 17. The fairing 1, the windshield 2, and the frictional plate 10 are, thus, coupled together by guide pins 18 extending through the slots 15, 16, 17. Each guide pin 18 consists of a head 18a, a shank 18b, and a coupling ring 18c. The fairing 1, the windshield 2, and the frictional plate 10 are sandwiched between the head 18a and the coupling ring 18c. Since the guide pins 18 loosely couple the members together, the windshield 2 can move vertically relative to the fairing 1. A slotted washer 19 is rigidly fixed around each slot 15 in the windshield 2 so as to reduce friction between the windshield 2 and the coupling ring 18c when the windshield 2 moves vertically. Thus, they are protected.

In the described arrangement, the fairing 1 and the windshield 2 are provided with the slots 15 and 16, respectively, and therefore it is only necessary that the length of each slot be half the distance to be traveled by the windshield 2.

FIG. 5 particularly illustrates the link rod 5 and the handle 6 of the lock member. As shown, the link rod 5 is a bent arm, one end of which is mounted to one side end of the clamp plate 3 via a shaft 20 (see FIG. 1). The other, bent end of the rod 5 is attached to the enlarged portion 6a of the handle 6 via a shaft 21 at a position radially offset from the position of the shaft 8.

The manner in which the position of the windshield 2 is adjusted is now described by referring to various figures. When the windshield 2 is to be moved upward or downward, the handle 6 is rotated in the direction indicated by the arrow A in FIG. 5. The shaft 21 of the link rod 5 then moves along an arcuate path toward its unlocked position in the direction indicated by the arrow B about the shaft 8 until the rod 5 assumes the position indicated by the phantom line. In this condition the center line $l_2$ that passes through the centers of the shafts 20 and 21 is located above the shaft 8, and the shaft 20 lies in front of the shaft 8. This condition is maintained even if the driver releases the handle 6. As a result, the front end of the link rod 5 moves a stroke S to the left from its original position as viewed in the figure. The clamp plate 3 is thus moved to the left a distance corresponding to this stroke. This pivots the clamp plate 3 about the shoulder bolt 4 in the direction indicated by the arrow C, as shown in FIGS. 1 and 2, to thereby release the windshield 2 from the frictional plate 11. Thus, the windshield 2 is free to be moved vertically, i.e., in either direction indicated by the arrows D. After the windshield is moved a suitable distance, the handle 6 is rotated back in the direction indicated by the arrow E. Thus, the shaft 21 of the link rod 5 is caused to move around the shaft 8 in the direction indicated by the arrow F, so that it returns to its locked position indicated by the solid lines in FIGS. 1 and 5. As a result, the shaft 20 is caused to be pulled to the right a distance corresponding to the stroke S, as shown in FIG. 5. As a further result, the clamp plate 3 is caused to pivot in the direction indicated by the arrows G in FIGS. 1 and 2 to press the windshield 2 between the frictional plates 10 and 11. Consequently, the windshield 2 is locked in its adjustment position.

The resilience of the frictional plate 11 and other component parts biases the link rod 5 in the direction indicated by the arrow H in FIG. 5. This biasing force acts along the center line $l_1$ of the shafts 20 and 21 which is the inversion of the center line $l_2$. Therefore, the windshield 2 is maintained locked unless the handle is rotated.

It will thus be appreciated that the handle 6 can be operated and the vertical position of the windshield 2 can be adjusted while the driver remains riding on the vehicle. Further, in the present example, the lock member can be operated simply by rotating the handle 6.

Moreover, the present invention is not limited to the hereindescribed arrangement, but rather various modifications and changes can be made thereto. For example, the lock member including the link rod and the handle can be replaced by gears, a ratchet mechanism, or equivalent devices permitting the clamp plate to be rotatably connected to the fairing. Also, the windshield may be provided with a rack, and the fairing may be provided with a pinion gear meshing with the rack, in which case the vertical position of the windshield can be adjusted by rotating the pinion gear.

What is sought to be protected herein, therefore, shall be as recited in the appended claims.

I claim:

1. For use on a vehicle having a vehicle body, a vertically adjustable windshield organization, comprising:
    a windshield member having its lower end disposed in overlying relation to the upper end of said vehicle body;
    means for moving said windshield member in vertical relation to said vehicle body; and
    releasable clamp means for locking said windshield member with respect to said vehicle body, including a laterally extensive clamp plate selectively pressingly engageable with said windshield member overlying the lower end thereof, and releasable latch means accessible from the lateral end of said clamp plate for operating said clamp plate to press said windshield member against said vehicle body or to release it therefrom.

2. The organization according to claim 1 in which said clamp plate is mounted on said vehicle body for pivotal movement toward and away from said windshield member, and said latch means being effective in its released condition to pivot said clamp plate away from said windshield member and in its locked condition to pivot said clamp plate into engagement with said windshield member.

3. The organization according to claim 2 including resilient frictional plate means sandwiching said windshield member between said vehicle body and said clamp plate.

4. The organization according to claim 2 in which said latch means includes a manually operable handle rotatably mounted on said vehicle body, a pin on said handle radially offset from the axis of rotation of said handle; and a link rod having one end connected to the end of said clamp plate and the other end connected to said pin.

5. The organization according to claim 4 including a clearance hole adjacent the lower end of said clamp plate, a shoulder bolt having a shank extending through said clearance hole in spaced relation from the wall thereof, and means at the end of said shank for connecting said shoulder bolt to said vehicle body, said shoulder bolt cooperating with said clearance hole for pivotal movement of said clamp plate upon release of said latch means.

* * * * *